Aug. 17, 1943.  A. M. GOODLOE  2,327,184
FILTER BODY
Filed July 1, 1941

INVENTOR.
Alfred M. Goodloe,
BY George D. Richards,
ATTORNEY.

Patented Aug. 17, 1943

2,327,184

UNITED STATES PATENT OFFICE 2,327,184

FILTER BODY

Alfred M. Goodloe, Montclair, N. J., assignor to Metal Textile Corporation, West Orange, N. J., a corporation of Delaware Application July 1, 1941, Serial No. 400,590

2 Claims. (Cl. 183—69)

This invention relates to an improved filter body structure; and the invention has reference, more particularly, to a filter body of novel structure which is especially well adapted for use as a wet, viscous or semi-dry impingement type air or gas filter.

Heretofore, in the provision of impingement type air or gas filters, in which the filter elements are coated with oil or other more or less viscous substance to catch and hold dust or other particles suspended in the air or gas passed therethrough, the filter body has been made up of a plurality of superposed layers of perforate material, such e. g. as perforated sheet material or mesh material, laid in planes perpendicular to the flow of air or gas directed therethrough. Where, however, a plurality of mesh layers e. g. are superposed in mutually contacting or meeting relation, and subject to compression by the force of the air or gas stream passed therethrough, due to contiguous contact of mesh strand portions of adjacent layers, a considerable portion of the impingement surface provided by the mesh strands is shielded from contact by the passing air or gas, thus substantially reducing the efficiency of the filter body; and, furthermore, the separated dust or other particles accumulating on the impingement surfaces tends to build up and cake at isolated points where the mesh strands of adjacent layers are in contact, thereby rendering cleansing or washing of the filter body very difficult.

Although it is highly desirable from the standpoint of efficiency to employ layers of fine mesh, such fine mesh, especially when of knitted character, is generally of flimsy character, is not self-sustaining, and consequently a filter body composed of layers thereof is easily subject to compression by the force of the air or gas stream moving therethrough, whereby tendency to crowd the layers together is increased, so that the undesirable conditions above referred to are further enhanced.

Air and gas cleaning would be very efficiently accomplished by a filter body composed of fine and relatively frail mesh material, such e. g. as a fine or more or less closely woven or knitted mesh produced from a ribbon-like strand, were it not for the fact that such material is, when arranged in superposed layers, especially subject to the occurrence of the undesirable conditions above mentioned.

Having these things in view, it is an object of this invention to provide a filter body of novel structure including the desirable fine and relatively frail mesh material, and especially fine and comparatively closely knitted metallic mesh material, in combination with means for firmly supporting successive layers thereof against sagging and displacement under compression, while at the same time providing intervening spaces between the successive fine mesh layers, whereby to allow for intermediate eddying of the air or gas stream flowing from one such layer to another, so that the resultant turbulence of the air or gas within the filter body mass tends to bring the dust or like particles suspended therein uniformly in contact with all parts and both faces of said mesh layers, with consequent superior separating efficiency, and yet with reduced tendency to accumulate the separated dust or other particles in isolated caked choking masses within the filter body, but rather to more uniformly distribute said separated dust or other particles throughout the entire area of the filtering layers.

Another object of this invention is to provide a novel filter body structure comprising spaced filter layers of comparatively fine mesh material, wherein the form and relation of the spacing means is such as to firmly grip and hold the frail and fine mesh layers at a multiplicity of points throughout the areas thereof, especially when the filter body is subject to compression by the force of the air or gas stream passed therethrough, and yet leaving the combined mass somewhat resilient, so as to easily release accumulated dust or other particles, when the same is subjected to a cleansing or washing operation.

Another object of this invention is to provide a novel filter body structure wherein a plurality of spaced filtering mesh layers of successively graded mesh size, from comparatively coarse at the front to relatively fine mesh at the back, may be attained.

Other objects of this invention, not at this time more particularly enumerated, will be understood from the following detailed description of the same.

Illustrative embodiments of this invention are shown in the accompanying drawing, in which.

Similar characters of reference are employed in the described views, to indicate corresponding parts.

In the make up of the novel filter body structure according to this invention, the filtering layers comprise flat sheets of comparatively fine or closely woven or knitted mesh material. For example, the main filtering layers preferably comprise comparatively fine mesh sheets knitted from a flat ribbon-like strand, such e. g. as a fine ribbon of metallic or non-metallic material, but preferably a fine ribbon of copper or other selected metal. Such fine knitted mesh may be formed into single or double ply layers, and in the latter case may comprise tubular knit mesh flattened into the desired double ply layer. Fine mesh layers of this character, which provide the desired multiplicity of small mesh openings, and the ribbon-like strands of which provide a considerable area of dust catching surface bounding said mesh openings, are flimsy and, not being self-supporting, are incapable of retaining a flat spread condition; in addition to this, if it were attempted to superpose a plurality of fine mesh layers of this character face to face, much of the dust catching and holding surface of the strands thereof would be obstructed by covering strand portions of contiguous layers, especially when the superposed layers are compressed and crowded together by the force of air or gas streams passed therethrough, and consequently their filtering efficiency, which would otherwise be marked, is so substantially reduced as to render impractical use of such fine mesh layers in superposed relation as a filter body.

I have found, however, that the inherent efficiency of such fine mesh layers, especially when provided by knitted material, may not only be retained and availed of but, in fact, increased, when the same are spaced apart, and at the same time suitably supported against both sagging, bulging or crowding together under compressive action of an air or gas stream passed therethrough; and to this end I have provided, in the filter body structure according to this invention, a novel association and combination with such fine mesh layers of intermediate spacing layers formed by corrugated, stiff and relatively coarse mesh layers knitted or woven from relatively heavy metallic wire, such e. g. as round steel wire.

Figure 1:
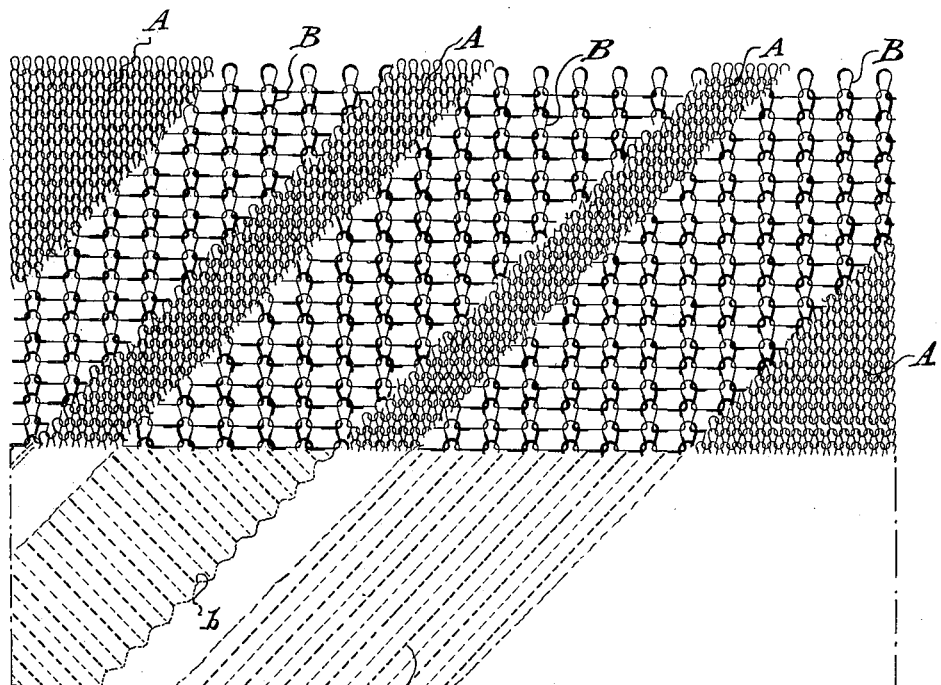
Fig. 1 is a fragmentary face view, schematically shown, of a filter body mass constructed according to this invention, layers of filtering mesh and spacing mesh being successively broken away to show the cooperative assembled relation thereof.
Figure 2:
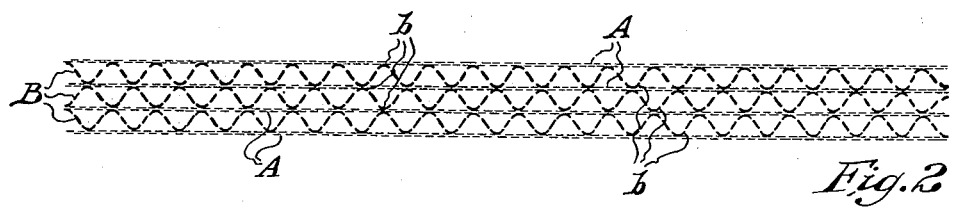
Fig. 2 is a sectional view of the filter body mass of Fig. 1, also schematically illustrated.

In Figs. 1 and 2 of the accompanying drawing is shown one embodiment of the novel filter body structure according to this invention, the same comprising a plurality of filtering layers A of comparatively fine knitted mesh fabric, preferably a fabric knitted from a flat ribbon-like strand; said layers A being spaced apart, one from another, by intervening corrugated, stiff and relatively coarse mesh layers B knitted from round wire, the latter layers being non-sagging and self-supporting. The spacer layers B are corrugated in such manner that the corrugations b formed therein extend obliquely between parallel edges thereof. In assembling the fine mesh layers A and intervening corrugate spacer mesh layers B in superposed relation, alternate spacer mesh layers B are so disposed that the corrugations b thereof cross each other respectively at opposite sides of an intermediately disposed fine mesh filtering layer A. As a result of this arrangement, the intermediate fine mesh filtering layer A is gripped between adjacent spacer mesh layers B at a multiplicity of points where the respective corrugations of the latter cross or intersect, and is thus firmly supported and maintained properly spread in a plane perpendicular to the flow of an air or gas therethrough. As thus gripped, the fine mesh filtering layers A cannot sag or bulge under compression, in fact, the compressive force of an air or gas stream, moving through the filter body so composed, tends to firmly press the fine mesh filtering layers and spacer mesh layers together so that the gripping effect of the latter upon the former is increased, and the filtering layers thereby more strongly held against bulging or other displacement.

The spacing effect of the spacer mesh layers B functions to provide a substantial comparatively free air space between adjoining fine mesh filtering layers A, and consequently, due to the baffling effect of the filtering layers A, the air or gas stream moving through the filter body will tend to eddy between said filtering layers A. Such eddying tends to keep the dust or other particles suspended in the air or gas in movement and more uniformly distributed therethrough so as to be more or less evenly deposited on the front of a succeeding filtering layer after passing through a preceding filter layer, while at the same time, the eddying air also tends to carry some of the dust or other particles in contact with the rear face of the preceding filter layer so as to be caught and held thereon; all of which tends to increase the efficiency of the filtering action. The described arrangement prevents isolated clogging accumulations of deposited dust, and resultant non-uniform rise in resistance to air or gas stream flow.

Owing to the spaced and strongly supported arrangement of the fine mesh filtering layers which is provided in my novel filter body structure, and the resultant more even distribution thereover of the deposited dust or other particles, with minimum tendency to densely accumulate and cake in isolated areas, the cleansing or washing of the filter body can be more easily and quickly accomplished, either by pressure hosed water or steam or by more or less violent agitation of the filter body in a cleansing bath, such as a hot caustic solution. Furthermore, since each fine mesh filtering layer is flexible, under such washing action, enough movement or flexing thereof will be permitted as to materially aid the deposited dust to readily break loose and detach itself and thereupon be quickly washed away.

Figure 3:
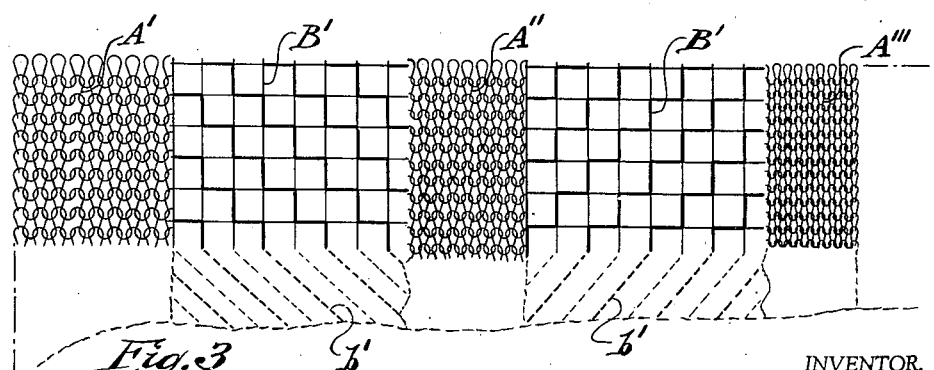
Fig. 3 is a fragmentary view, similar to that of Fig. 1, but showing filtering mesh layers of graded mesh size, from comparatively coarse at the front to relatively fine at the back, and also showing a modified type of spacing mesh layers between said filter mesh layers.

In some types of filter bodies it is desirable that the filtering mesh layers be graded as to size of the mesh openings thereof, so that a somewhat more open mesh material is located at the front or air or gas stream receiving face of the filter body, with succeeding filtering layers diminishing as to size of their mesh openings, with that of smallest size at the back or air or gas stream discharging face of the filter body. This is shown in Fig. 3, wherein the first filtering layer A' is of comparatively coarse mesh, the second filtering layer A" of smaller mesh, and the third filtering layer A''' of still smaller mesh, etc. In Fig. 3 I have also shown that the spacer layers may be made of woven mesh as distinguished from knitted mesh, the woven mesh spacer layers being indicated by the reference character B'. Said spacer layers B' are provided with oblique corrugations b', in substantially the same arrangement and for the same purposes as already above described. It may be pointed out that when woven mesh is used for the spacer layers, the latter could be laterally deformed by embossments of any desired geometrical form other than corrugations.

It will be understood that the novel filter body structure in use is mounted in a suitable supporting frame (not shown) having open front and rear sides to expose the faces of the filter body, all in a manner well known to those skilled in the art. It will also be understood that any suitable means may be utilized to retain the filtering and spacer layers of the filter body structure in the described assembled relation.

Having now described my invention, I claim:

1. A filter body comprising, a plurality of substantially flat filtering layers of comparatively fine pliant mesh material, and corrugate spacer layers made of relatively coarse rigidulous mesh material disposed between adjacent filtering layers, the corrugations of said spacer layers being disposed to extend obliquely therethrough between opposite edges thereof, and said spacer layers being relatively disposed so that corrugations of one such spacer layer incline in one direction and those of a succeeding such spacer layer incline in a substantially perpendicular direction, whereby to cross one another and thus engage and support an intermediate contiguous filtering layer at a multiplicity of uniformly spaced points throughout the area thereof so as to support the same in a plane perpendicular to the flow of an air or gas stream passed therethrough, while at the same time spacing successive filtering layers one from another.

2. A filter body as defined in claim 1 wherein the filtering layers comprise knitted mesh knit from flexible flat ribbon-like metallic wire, and the spacer layers comprise knitted mesh knit from rigidulous round metallic wire.

ALFRED M. GOODLOE.